(12) United States Patent
Blonde et al.

(10) Patent No.: US 7,545,950 B2
(45) Date of Patent: Jun. 9, 2009

(54) IMAGE PROCESSING APPARATUS AND METHOD

(75) Inventors: Laurent Blonde, Thorigné-Fouillard (FR); Luis Montalvo, Domloup (FR); Kervec Jonathan, Paimpont (FR)

(73) Assignee: Thomson Licensing, Boulogne-Billancourt (FR)

( * ) Notice: Subject to any disclaimer, the term of this patent is extended or adjusted under 35 U.S.C. 154(b) by 390 days.

(21) Appl. No.: 11/114,657

(22) Filed: Apr. 26, 2005

(65) Prior Publication Data
US 2005/0270547 A1 Dec. 8, 2005

(30) Foreign Application Priority Data
Apr. 28, 2004 (FR) .................. 04 04505

(51) Int. Cl.
*G06K 9/00* (2006.01)
(52) U.S. Cl. .................................. 382/100
(58) Field of Classification Search .............. 358/1.6, 358/3.28; 380/235, 210, 229, 218, 10–19, 380/200–205, 221, 238; 345/156; 713/176; 382/100, 199; 348/460–468
See application file for complete search history.

(56) References Cited
U.S. PATENT DOCUMENTS
4,567,519 A * 1/1986 Richard .................. 375/240.12

6,181,833 B1 * 1/2001 Kuwabara ................ 382/298
7,043,019 B2 * 5/2006 Tehranchi et al. .......... 380/218
7,263,202 B2 * 8/2007 Davis et al. ............... 382/100
7,336,799 B2 * 2/2008 Matsumura et al. ........ 382/100
2002/0168069 A1 * 11/2002 Tehranchi et al. .......... 380/235
2003/0011617 A1 * 1/2003 Iida ......................... 345/611
2003/0202678 A1 * 10/2003 Silverstein ................ 382/100
2003/0223584 A1 * 12/2003 Bradley et al. ............. 380/229

FOREIGN PATENT DOCUMENTS
EP    1 237 369 A2    9/2002
EP    1 301 034 A2    4/2003
EP    1 372 342 A1    12/2003

OTHER PUBLICATIONS
Search Report.
* cited by examiner

*Primary Examiner*—Sherali Ishrat
(74) *Attorney, Agent, or Firm*—Robert D. Shedd; Joseph J. Opalach; Reitseng Lin

(57) ABSTRACT

The present invention relates to an image processing apparatus and device intended to temporally modulate a sequence of source images with a modulation image comprising at least one anti-copy pattern. According to the invention, it is proposed that the modulation image be generated on the basis of the source image to be modulated in such a way as to place the patterns at locations of the image that may hinder the person watching an illicit copy of the video sequence (filmed for example by a camcorder). The modulation image is for example an image of the secondary contours of the image. The patterns are therefore placed in the low-gradient zones of the source image.

7 Claims, 2 Drawing Sheets

IMAGE PROCESSING APPARATUS AND METHOD

This application claims the benefit, under 35 U.S.C. 119 of French Patent Application 0404505, filed Apr. 28, 2004.

FIELD OF THE INVENTION

The present invention relates to an image processing method and device.

Visual contents, be they still or moving images, are in general creations which benefit from copyright-related exclusivity guarantees. Their reproduction is in general permitted only within a strictly defined framework which allows for remuneration of authors and their beneficiaries.

In order to ensure that these legal rules are correctly adhered to, numerous systems have been developed to prevent illegal copies or sufficiently impair their quality as to render them unusable.

BACKGROUND OF THE INVENTION

Within this framework, patent application EP 1 237 369 aims to combat the copying of images by picture-taking during their display, for example with a camcorder in a cinema auditorium. With this aim, it is proposed that the intensity of the pixels of a pattern be modulated about the value to be displayed at a high frequency which renders the pattern invisible to the human eye but which generates artefacts on the sequence filmed by the camcorder. This pattern is commonly called watermarking or anti-copy pattern. The shape of the pattern is determined so as to inscribe for example messages of the type "ILLEGAL COPY" which will appear in the images displayed by the camcorder.

In order for the pattern to be invisible to the naked eye, the modulation consists in alternating images in which the pattern is bright with images in which it is dark, the mean intensity of the pattern over several images corresponding to that to be displayed in the images in the absence of a pattern. During the display of these images, the eye carries out an integration and in fact perceives the mean intensity. This technique may also be applied to the colour of the images by alternating images in which the pattern is more coloured with images in which it is less so, the mean colour of the pattern over several images corresponding to that to be displaced in the absence of a pattern.

In practice, the patterns are contained in a modulation image and the images of the sequence to be protected are modulated with this modulation image.

One of the principal difficulties of this type of technique is to determine the locations at which to place the pattern or patterns in the images so as to maximize the hindrance to a person watching an illicit copy generated for example by a camcorder.

SUMMARY OF THE INVENTION

According to the invention, a solution making it possible to solve this difficulty is proposed. According to the invention, the position and/or the shape of the patterns is defined as a function of the source image to be modulated. More particularly, the modulation image is generated on the basis of the source image that it modulates. Preferably, the modulation image is produced on the basis of the secondary contours of the image to be modulated. The secondary contours of the image to be modulated are employed to form the patterns of the modulation image. The patterns therefore get placed in the low-gradient zones of the source image.

The invention relates to a method of image processing intended to temporally modulate a sequence of source images with a modulation image comprising at least one pattern, said sequence of source images being modulated with the modulation image in such a way that said at least one pattern is invisible to the human eye when the images of the sequence are displayed and that artefacts appear when said images are copied by picture-taking during their display, wherein the shape and/or the position of said pattern of the modulation image is determined by analysis of the source image that said modulation image modulates.

More particularly, the modulation image is generated directly on the basis of the source image that it modulates and the modulation image is an image of the secondary contours of the source image that it modulates.

BRIEF DESCRIPTION OF THE DRAWINGS

The invention will be better understood on reading the description which follows, given by way of nonlimiting example, and with reference to the appended figures among which.

DESCRIPTION OF PREFERRED EMBODIMENTS

According to the invention, each modulation image is calculated on the basis of the image that it modulates. The geometry of the modulation image therefore repeats that of the image that it modulates. Moreover, the processing applied to the source image to generate the modulation image is defined such that the patterns of the modulation image are located in low-gradient zones of the image to be modulated. For this purpose, the image of the secondary contours of the image to be modulated is chosen for use as modulation image.

Figure 1:
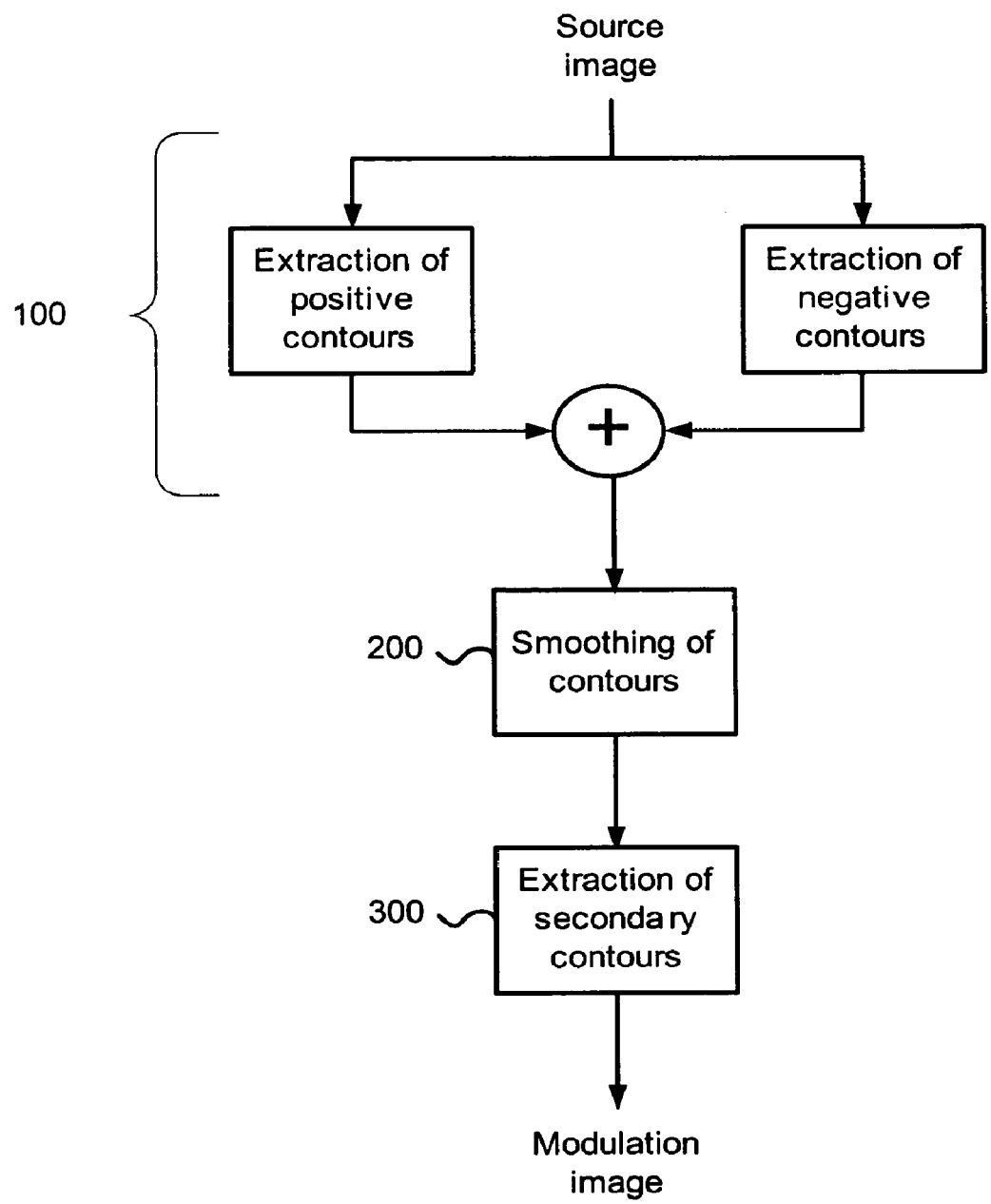
FIG. 1 is a flowchart summarizing the steps for generating a modulation image according to the invention.

With reference to FIG. 1, the modulation image is for example generated by applying the following steps to the image to be modulated:

detection of the contours 100 in the image to be modulated;

smoothing 200 of the detected contours; and extraction of the secondary contours 300 from the smoothed image.

The image of the secondary contours that are thus obtained will then be used as modulation image.

Figure 2:
FIG. 2 illustrates the application of the various steps of FIG. 1 to a source image.

The detection of the contours 100 may be done by parallel application of two filterings on the source image to be modulated: a positive filtering with kernel $$\begin{bmatrix} -1 & -1 & -1 \\ -1 & 8 & -1 \\ -1 & -1 & -1 \end{bmatrix}$$

detecting the contours corresponding to light to dark transitions and a negative filtering with kernel $$\begin{bmatrix} 1 & 1 & 1 \\ 1 & -8 & 1 \\ 1 & 1 & 1 \end{bmatrix}$$

detecting the contours corresponding to dark to light transitions. The result of these two filters is added up to form a contour image. FIG. 2 shows, for a given source image, the result at the end of each of steps 100, 200 and 300. In the image illustrating the detection of the contours in the source image, the contours detected are represented by the most luminous pixels of the image.

Preferably, the contours detected are thereafter smoothed to spatially merge the positive contours and the negative contours and to eliminate noise. Specifically, in the case of a fine light band on a dark background, the above filters detect two very closely spaced contours. This smoothing operation 200 makes it possible to merge them. It is for example carried out by a 5×5 averaging operation. Each pixel of the contour image is thus assigned the mean level of the 25 pixels of the block of pixels encompassing the pixel considered, the pixel considered being the centre of said block.

In the image of FIG. 2 where the contours have been smoothed, the secondary contours are represented by pixels having a lesser intensity with respect to the most luminous pixels representing the main contours. The secondary contours may then be extracted from this image using a table of LUT (Look Up Table) type favouring the low levels with respect to the high levels. The very low levels are however removed so as to eliminate the contours due to noise. The LUT table is for example defined as follows:

| Input level | Output level |
|---|---|
| From 0 to 23 | 0 |
| From 24 to 31 | 255 |
| From 32 to 95 (=X) | 255 − 4.(X − 32) |
| From 96 to 255 | 0 |

The image of the secondary contours which is thus obtained is used as modulation image in the modulation processes aimed at protecting the visual contents against copying by a camcorder. The last image of FIG. 2 represents the resulting image after modulation of the source image by the image of the secondary contours. The spots appearing on the jacket are the result of the processing according to the invention. These spots are yet more visible in the case of a colour image sequence. They deform progressively as a function of the modifications of the composition of the scene. After visualization by a camcorder, these spots flicker or change colour as a function of the display frequency of the display panel used and of the acquisition frequency of the picture-taking device (camcorder).

The method may easily be implemented in a conventional digital processor.

In conclusion, the method of the invention has the following advantages:

the patterns generated are not superimposed on the main contours of the source image; there is therefore approximately a doubling of the number of contours in the image acquired with a camcorder, half of these contours corresponding to nuisance information;

the patterns of the modulation image have the feature of following the motions present in the video sequence, and this has made it possible not to create defects related to the motion of the eye during the visualization of the sequence;

when a contour is present in two images only, the eye can perceive the appearance or the disappearance of the modulation since the eye is very sensitive to the abrupt transitions in the image sequence and since the patterns are placed in the conventional case independently of the content of the image to be modulated; in the present case, this appearance or disappearance of the modulation is less perceptible to the eye since, during the display of the image sequence, it concentrates on the main contours so as to analyze the image to the detriment of the intermediate zones which exhibit few contours visible to the naked eye.

What is claimed is:

1. A method of image processing intended to temporally modulate a sequence of source images with modulation images, comprising:

modulating at least one source image of said sequence with a modulation image that includes at least one pattern in such a way that said at least one pattern is invisible to the human eye when the images of the sequence are displayed and that artifacts appear when said images are copied by picture-taking during their display, wherein the modulation image is an image of secondary contours of the source image that said modulation image modulates, wherein said secondary contours are represented by pixels of the source image having a lesser intensity with respect to the most luminous pixels representing main contours of the source image.

2. The method according to claim 1, wherein the main contours are generated by filtering of in the source image.

3. The method according to claim 1, wherein the contours of the image are smoothed before selecting the contours with low gradient.

4. A method of image processing for temporally modulating a sequence of source images with modulation images, comprising:

modulating at least one source image of said sequence with a modulation image that includes at least one pattern, the modulating performed in such a way that the at least one pattern is invisible to the human eye when the images of the sequence are displayed and that artifacts appear when the images of the sequence are copied by picture-taking during their display, wherein the modulation image is an image of secondary contours of the source image that said modulation image modulates, wherein said secondary contours are represented by pixels of the source image having a lesser intensity with respect to the most luminous pixels representing main contours of the source image.

5. The method according to claim 2, wherein said filtering is followed by extraction of the secondary contours with low gradient using said representation of the secondary contours.

6. The method of image processing according to claim 4, further comprising:

generating the main contours of the source image by filtering the source image.

7. The method of image processing according to claim 6, further comprising:

extracting the secondary contours with low gradient of the source image using said representation of the secondary contours.

* * * * *